United States Patent Office 2,910,407
Patented Oct. 27, 1959

2,910,407
METHODS FOR ADMINISTERING VACCINE TO FOWL

Stephen B. Hitchner, Verona, Wis., assignor to American Scientific Laboratories, Inc., Madison, Wis., a corporation of Wisconsin No Drawing. Application May 12, 1958
Serial No. 734,400

9 Claims. (Cl. 167—78)

This invention relates to a method for administering vaccine to fowl, and particularly a method for administering vaccine for infectious laryngotracheitis.

Infectious laryngotracheitis is a virus disease affecting fowl, particularly chickens and pheasants. The virus invades the upper respiratory tract of the bird, causing inflammation and exudation of the mucous membranes of the trachea, larynx, nasal passages and the eyes. The disease causes a loss in body weight, respiratory symptoms and frequently death as a result of accumulation of exudate in the larynx and trachea, which blocks the respiratory passages and causes death by suffocation. The disease may be prevented by vaccination. Millions of doses of laryngotracheitis vaccine are produced by licensed establishments each year.

Some years ago a "brush" method of vaccination was developed, which consisted of applying live virus to the mucous membrane of the cloaca, or anal opening of the bird (commonly and hereafter sometimes called the vent). The virus applied in this manner by means of a brush caused the development of an active immunity against the disease without causing a harmful clinical infection to occur. The common method of applying the laryngotracheitis virus to the vent of birds has been by means of a small, stiff-bristled brush. The mucous membrane of the vent is exposed, the brush dipped into the bottle of vaccine and the vaccine applied by making three to five brushing strokes across the membrane. This causes abrasion of the membrane, some bleeding and at the same time deposits the virus in contact with the susceptible tissue. Heretofore, it has been assumed that abrasion of the membrane was an essential part of the procedure to obtain a good vaccination reaction, referred to as a "take." When satisfactory vaccination has been accomplished, inflammation and exudation occur at the site of vaccination, which can be observed on the fourth or fifth day postvaccination.

For many years there has been a demand for an improved method of vaccination for laryngotracheitis. The present method is time-consuming, and because of the high costs of labor, the labor of application comprises a large portion of the cost of vaccination.

Most vaccination for laryngotracheitis is performed by labor crews. A wide variation in application exists between crews and among members of the same crew when applied by the brush. Some crew members fail to dip the brush in the vaccine each time before vaccinating a bird. Some persons apply the vaccine by making one stroke of the brush across the membrane, while others may make several strokes of the brush across the membrane. Such wide variations in individual application of the vaccine can only result in a wide variation of the anticipated results. Under the best methods of administration, the vaccine dosage when applied by a brush is small, approximately 0.007 cc., and under conditions of poor administration would be even less than this amount.

The present brush method of administration is a highly insanitary method of application. The vaccine, which is produced with care to keep contaminating organisms at a minimum, is grossly contaminated with intestinal organisms and fecal matter after the brush from the first vaccinated bird is dipped into the bottle of vaccine. Bottles of vaccine usually contain at least 500 doses of vaccine; thus, the contamination present when the brush is redipped into the bottle for vaccination of 500 or more birds is greatly increased. Not only is the method insanitary but can serve as a means of spreading disease from bird to bird within a flock.

The degree of abrasion of the mucous membrane varies with the stiffness of the brush bristles and the manner in which the vaccine is applied to the mucous membrane. Until now it has been assumed that this added injury to the chick by the abrasion of the mucous membrane was necessary, and textbook authorities have indicated that such abrasion is a part of proper vaccination technique.

Successful application of the vaccine by the present brush method is further limited by the age of the bird, since manipulation of the vent for proper application becomes difficult in birds less than four weeks of age.

It is an object of the present invention to provide an effective method for administering vaccine for infectious laryngotracheitis to large numbers of fowl in uniform and adequate dosages without substantial variation in the size of dosages or in the technique of administration.

A further object of the present invention is to provide a sanitary method for administering such vaccine which eliminates contamination of the vaccine and possible transmission of infectious agents from one bird to another during the vaccinating procedure.

An additional object of the present invention is to provide a simple method for administering such vaccine which is particularly efficient and speedy in the vaccination of a large flock of birds.

Another object of the present invention is to provide a method for administering such vaccine which eliminates unnecessary injury to the mucous membrane of the vent of the bird and provides improved means for determining whether a vaccination has been successful, since reaction at the site of vaccination is attributable only to the action of the virus on the tissue without any reaction from injury to the membrane by applicators.

Other objects and advantages will be apparent from the following description.

In accordance with the present invention, the vaccine for laryngotracheitis virus is administered by dropping the vaccine from a dropping bottle or tube on the exposed membrane of the vent or on the vent opening. The operator may hold the chicken with the vent open and drop the vaccine from a short distance above into the open vent, or he may merely drop the vaccine on the closed vent. When the drop of vaccine comes in contact with the vent opening (whether the vent is opened or closed) a reflex action of the vent occurs which automatically sucks in the drop of vaccine and spreads it over the susceptible mucous membrane within the vent. Accordingly, the vaccination may be performed without any direct contact with the vent by the vaccinator and without any scratching or injury to the membrane.

The vaccine is preferably administered by dropping one drop of the vaccine into or on the vent from a plastic bottle with a standard gauge needle to provide a uniform dosage in each drop. A 19-gauge needle is a preferred size of the needle which delivers approximately 0.016 cc. per drop, which is the approximate amount of the desired dosage and more than twice the amount that is generally applied by the present brush method under the best conditions. It must be understood that the present invention is applicable with variations as to the type of dropper and size of dosage as may be required in any particular situation.

It can be readily seen that the method of application by the present invention has great advantages over present techniques, as the amount of vaccine used for each bird is substantially uniform. Since there is no dipping and redipping of a brush or other object in the vaccine after contact with the vent, the present method is much more sanitary—the vaccine in the bottle retaining its original purity—and there is substantially less possibility of the transmission of infectious agents from one bird to another during vaccination.

There is no injury to the bird by abrasion of the mucous membrane by administration of the vaccine pursuant to the present invention.

Because the drop method does not require handling of the vent, it is possible to administer the vaccine to chicks of any age.

In the use of this new method, it was discovered that abrasion of the membrane was not necessary in order to administer an effective vaccination. It has been shown in tests made by applicant that the present invention is as effective in its results as the conventionally used brush method. By use of the present invention, a more accurate determination can be made as to the effectiveness of the vaccine. As stated, an effective vaccination is shown by inflammation and exudation at the site where the vaccine was applied, four or five days after application of the vaccine. It is sometimes difficult to determine the effectiveness of the vaccination when the brush method is used because the inflammation and exudation may be wholly the result of abrasion and irritation caused by injuries to the tissues by the brush itself, rather than by the vaccine. In the present invention, the inflammation, reddening and exudation which is observed results solely from the vaccine itself, and the effectiveness of the vaccine can thus be readily determined.

Obviously, the application of the vaccine by the present invention can be performed more efficiently and with less labor than by conventional brush methods. The present invention does not require the continual manual dipping and redipping of the brush into the bottle, nor is it necessary to stroke the brush back and forth several times in the bird's vent to assure abrasion of the mucous membrane and a sufficient quantity of vaccine.

I claim:

1. A method for administering vaccine to fowl for infectious laryngotracheitis which comprises dropping the vaccine into the opened cloaca of the fowl.

2. A method for administering vaccine to fowl for infectious laryngotracheitis which comprises dropping the vaccine onto the outer surface of the cloaca of the fowl.

3. A method for the vaccination of fowl for infectious laryngotracheitis comprising application of the vaccine by dropping a sufficient quantity of the vaccine on the cloaca of the fowl wherby to create a reflex action of the cloaca, causing the vaccine to be drawn within the vent.

4. A method for the vaccination of fowl for infectious laryngotracheitis comprising applying to the cloaca of the fowl a drop of vaccine from a dropper held directly above said cloaca whereby to create a reflex action of the cloaca, causing the vaccine to be drawn within the cloaca.

5. The method described in claim 4 wherein the said drop of vaccine constitutes approximately 0.016 cc.

6. A method for the vaccination of fowl for infectious laryngotracheitis comprising dropping into the opened cloaca of the fowl a drop of vaccine from a dropper held directly above said cloaca whereby to bring said vaccine in contact with mucous membrane within said cloaca.

7. The method described in claim 6 wherein the said drop of vaccine constitutes approximately 0.016 cc.

8. A method for the vaccination of fowl for infectious laryngotracheitis comprising applying to the cloaca of the fowl a drop of vaccine from a vaccine source held directly above said cloaca whereby to create a reflex action of the cloaca, causing the vaccine to be drawn within the cloaca.

9. A method for the vaccination of fowl for infectious laryngotracheitis comprising dropping into the opened cloaca of the fowl a drop of vaccine whereby to bring said vaccine in contact with mucous membrane within said cloaca.

References Cited in the file of this patent

UNITED STATES PATENTS

| | | |
|---|---|---|
| 2,767,117 | Crawley | Oct. 16, 1956 |
| 2,798,835 | Markham | July 9, 1957 |
| 2,798,836 | Bird | July 9, 1957 |
| 2,802,772 | Elder | Aug. 13, 1957 |

OTHER REFERENCES

Jones: Calif. Agr. Dept., vol. 22, April 1933, pp. 240–242.

Beaudette: Am. Vet. Med. Assn. J., vol. 82, March 1933, pp. 460–476.

Beach: U.S. Egg and Poultry M., vol. 39, August 1933, pp. 30–31, 58.

Richey: S.C. Agr. Exp. Circ. No. 99, 1955, pp. 1–12.